US005821642A

United States Patent [19]

Nishhira et al.

[11] Patent Number: 5,821,642

[45] Date of Patent: Oct. 13, 1998

[54] ARC PREVENTION CIRCUIT FOR A MECHANICAL SWITCH

[75] Inventors: Thomas S. Nishhira, Newark; David A. Blau, Cupertino; Stephen A. Calebotta, Saratoga, all of Calif.

[73] Assignee: Hubbell Incorporated, Orange, Conn.

[21] Appl. No.: 742,412

[22] Filed: Nov. 4, 1996

[51] Int. Cl.[6] .......... H02B 1/24

[52] U.S. Cl. .......... 307/127; 307/130; 307/141; 361/170; 361/195

[58] Field of Search .......... 307/112, 116, 307/117, 125, 127, 141.4, 141, 137, 130, 87; 340/310.04; 361/160, 170, 174, 195

[56] References Cited

U.S. PATENT DOCUMENTS

| | | | |
|---|---|---|---|
| Re. 35,220 | 4/1996 | Johnson | 315/208 |
| 3,725,888 | 4/1973 | Solomon | 340/258 A |
| 4,015,394 | 4/1977 | Tieden | 307/310 |
| 4,169,982 | 10/1979 | Rittmann | 307/116 |
| 4,340,826 | 7/1982 | Muchnick | 307/157 |
| 4,346,427 | 8/1982 | Blissett et al. | 361/173 |
| 4,370,564 | 1/1983 | Matsushita | 307/140 |
| 4,527,216 | 7/1985 | Stammely | 361/156 |
| 4,618,770 | 10/1986 | Maile | 250/338 |
| 4,660,024 | 4/1987 | McMaster | 340/522 |
| 4,695,769 | 9/1987 | Schwieckardt | 315/158 |
| 4,733,138 | 3/1988 | Pearlman et al. | 315/307 |
| 4,767,944 | 8/1988 | Takeuchi et al. | 307/132 E |
| 4,864,157 | 9/1989 | Dickey | 307/135 |
| 4,874,962 | 10/1989 | Hermans | 307/116 |
| 4,882,567 | 11/1989 | Johnson | 340/522 |
| 4,959,558 | 9/1990 | Kay et al. | 307/354 |
| 5,003,288 | 3/1991 | Wilhelm | 340/457.2 |
| 5,077,548 | 12/1991 | Dipoala | 340/522 |
| 5,132,596 | 7/1992 | Walters et al. | 315/159 |
| 5,189,393 | 2/1993 | Hu | 340/522 |
| 5,264,761 | 11/1993 | Johnson | 315/291 |
| 5,267,120 | 11/1993 | Graff et al. | 361/185 |

(List continued on next page.)

OTHER PUBLICATIONS

"Combo Sensors CUI–500–2000, CUI–500–2000 SC", *Engineering Installation Manual,* Universal Energy Control, Inc., Sep., 1993.
"Decorator Wall Switch Sensors", *Sensor Switch Technical Data,* Sensor Switch, Inc., Jun., 1994.
"2–Pole Control Unit With Computer Interface", *Sensor Switch Technical Data,* Sensor Switch, Inc., Jun. 1994.
"Line Voltage Ceiling Sensor", *Sensor Switch Technical Data,* Sensor Switch, Inc., Jun., 1994.
"2–Pole Wall Switch Sensors", *Sensor Switch Technical Data,* Sensor Switch, Inc., Jun., 1994.
"Large Area Wall Switch Sensors", *Sensor Switch Technical Data,* Sensor Switch, Inc., Jun., 1994.

*Primary Examiner*—Jeffrey A. Gaffin
*Assistant Examiner*—Jonathan Kaplan
*Attorney, Agent, or Firm*—Haverstock & Owens LLP

[57] ABSTRACT

A device for controlling a switching relay to deliver power to a load. The switching relay selectively couples a hot leg of a utility power supply to the load. The load is coupled to a neutral wire of the utility power supply. The device includes a sensor for detecting whether an area is occupied. If the sensor indicates that the area is occupied and the load is powered off, the device monitors the line voltage for a zero crossing. Upon detecting a zero crossing, an amount of time to a subsequent zero crossing is measured and stored. Then, the device waits the amount of time between zero crossings, less a delay time for closing the contacts of the relay, and initiates a closing of the contacts of the relay. Similarly, when the sensor detects that the area has not been occupied for a predetermined amount of time and the load is powered on, the line voltage is monitored for a zero crossing and a time to a subsequent zero crossing is measured and stored. Then, the device waits the amount of time between zero crossings, less a delay time for opening the contacts of the relay, and initiates an opening of the contacts of the relay. Accordingly, when the relay contacts actually close or open, the line voltage is at the ground level. Therefore, even if the load has a high in-rush current or high kick-back power, the relay contacts are not likely to be damaged.

35 Claims, 4 Drawing Sheets

U.S. PATENT DOCUMENTS

| | | | |
|---|---|---|---|
| 5,329,417 | 7/1994 | Kniepkamp et al. | 361/185 |
| 5,336,979 | 8/1994 | Watson et al. | 315/362 |
| 5,347,420 | 9/1994 | Fowler | 361/155 |
| 5,406,173 | 4/1995 | Mix et al. | 315/156 |
| 5,410,193 | 4/1995 | Backus et al. | 327/79 |
| 5,410,221 | 4/1995 | Mattas et al. | 315/307 |
| 5,473,202 | 12/1995 | Mudge et al. | 307/116 |
| 5,530,322 | 6/1996 | Ference et al. | 315/295 |
| 5,550,463 | 8/1996 | Coveley | 323/300 |
| 5,598,066 | 1/1997 | Wiesemann et al. | 315/159 |
| B1 4,874,962 | 4/1995 | Hermans | 307/116 |

| FIG. 4A | FIG. 4B |
|---|---|

ARC PREVENTION CIRCUIT FOR A MECHANICAL SWITCH

FIELD OF THE INVENTION

This invention relates to the field of automatic power switching circuits. More particularly, this invention relates to the field of preventing damaging arcs between relay contacts in power switching circuits.

BACKGROUND OF THE INVENTION

Circuits for providing power to lighting systems are commonly controlled by wall switches placed in easily accessible locations, such as adjacent to an entryway to a room or area. This arrangement allows a person to activate the lighting system for an area upon entry to the area and to deactivate the system upon leaving the area. Circuits for providing power to heating, ventilation or air conditioning (HVAC) systems are commonly powered at all times or, in a commercial building, at all times during working hours. Often, however, the lighting and/or HVAC systems remain powered on in areas of that are unoccupied for relatively long periods, thus wasting energy. In addition, unauthorized persons often attempt to enter non-public areas under cover of darkness. Therefore, to save energy and to increase security, it is often desirable to control lighting and/or HVAC systems such that they are automatically powered on upon a person entering an area and automatically powered off a time after the area is vacated. Occupancy sensors are known which detect the presence of persons in an area for controlling lighting and HVAC circuits.

Technology incorporated into such lighting and/or HVAC systems intended to minimize the energy consumed by the system when it is powered on, however, sometimes produce effects that can be detrimental to mechanical air-gap switches, rocker switches and switching relays commonly utilized in occupancy sensors and other switching systems. For example, instant start, high power factor electronic ballasts are becoming increasingly common in fluorescent lighting systems. These electronic ballasts are characterized by high in-rush currents upon the switch closing and high kick-back power upon the switch opening. Both high in-rush currents and high kick-back power can cause damage to the switch contacts, resulting in the premature failure of switching relays. For example, high in-rush currents have been blamed for fusing switch and relay contacts together and high kick-back power has been blamed for eroding switch and relay contacts.

Often, it is desired to replace a manually-operated switch with an occupancy sensor in an existing building or other structure to place the lighting and/or HVAC systems under automatic control. Generally, access to the electrical systems of a building is limited by wall and ceiling panels to pre-existing switch boxes. Only two wires are typically fed into the switch boxes when the building is constructed. These include a hot leg from the utility AC power supply to the switch, and a wire extending from the switch to the load. Generally, the load is connected to the neutral leg of the utility power supply to complete the circuit. Therefore, when the switch is closed, current flows from the hot leg through the switch and the load and, then, to the neutral leg.

A switching circuit including a transformer and a switching relay can alleviate the effects of a high in-rush current and high kick-back power. The transformer, however, requires connection to the hot leg and the neutral leg of the utility power supply. Extending the neutral leg to the switch box can be costly and time consuming due to limited access to the electrical system of the structure. For example, wall panels may need to be opened, ceiling panels may need to be removed and the neutral leg may need to be pulled through existing conduit. Therefore, such a circuit including a transformer cannot generally be used.

An electronic switching circuit including a diac and/or triac device, however, can be utilized without accessing the neutral leg. Triac and diac devices, however, tend to create electronic noise and radio frequency interference which can be detrimental to sensitive communication and computer equipment now used in many commercial buildings. In addition, diac and triac devices can be damaged by surge currents and voltages as high as 10,000 volts that can occur in electrical systems. Further, whether or not the load is powered on, these devices continuously draw power and generate heat. Many persons are not favorably disposed towards a switch panel being in a state of perpetual heating that is clearly palpable to the touch.

Therefore, what is needed is a means for automatically switching lighting and/or HVAC systems that can reliably function under loads characterized by high in-rush currents and high kick-back power, that does not require access to a third neutral AC wire and that does not utilize a diac or a triac.

SUMMARY OF THE INVENTION

The invention is a device for controlling a switching relay to selectively deliver power to a load, such as a lighting or HVAC system. The switching relay delivers power by selectively coupling a hot leg of a utility power supply to the load. The load can be coupled to a neutral wire of the utility power supply. Therefore, the switching relay can be incorporated into the electrical system of an existing building or other structure without accessing the neutral wire. Thus, the device can be easily installed without having to open wall panels or remove ceiling panels.

The device includes a sensor for detecting whether an area is occupied. If the sensor indicates that the area is occupied and the load is powered off, the device monitors the AC line voltage on the hot leg of the utility power supply for a zero crossing. Upon detecting a zero crossing, an amount of time to a subsequent zero crossing is measured and stored. Then, the device waits the amount of time between zero crossings, less a delay time for closing the contacts of the relay, and initiates a closing of the contacts of the relay. Therefore, by measuring the amount of time between zero crossings, the device predicts when a future zero crossing will occur, and initiates the closing of the contacts of the relay such that when the contacts actually close, the line voltage is at or near the ground level.

As the voltage on the hot leg rises above or falls below zero, current through the closed contacts of the relay gradually increases. Therefore, even if the load includes a device characterized by a high in-rush current, only a low level of current flows through the relay contacts upon closing. Only after the contacts have fully closed does the current increase with the voltage level.

Similarly, when the sensor detects that the area has not been occupied for a predetermined amount of time and the load is powered on, the line voltage is again monitored for a zero crossing and a time to a subsequent zero crossing is measured and stored. Then, the device waits an amount of time between zero crossings, less a delay time for opening the contacts of the relay, and initiates an opening of the contacts of the relay. Therefore, by measuring the amount of time between zero crossings, the device predicts when a future zero crossing will occur and initiates the opening of the contacts of the relay such that when the contacts of the relay actually open, the line voltage is at or near the ground level.

Because the current through the contacts of the relay is low when the line voltage is near zero, the contacts of the relay open when the current level is low. Thus, even if the load includes a device characterized by a high kick-back power, the contacts of the relay are not likely to be damaged.

DETAILED DESCRIPTION OF THE PREFERRED EMBODIMENT

Figure 1:
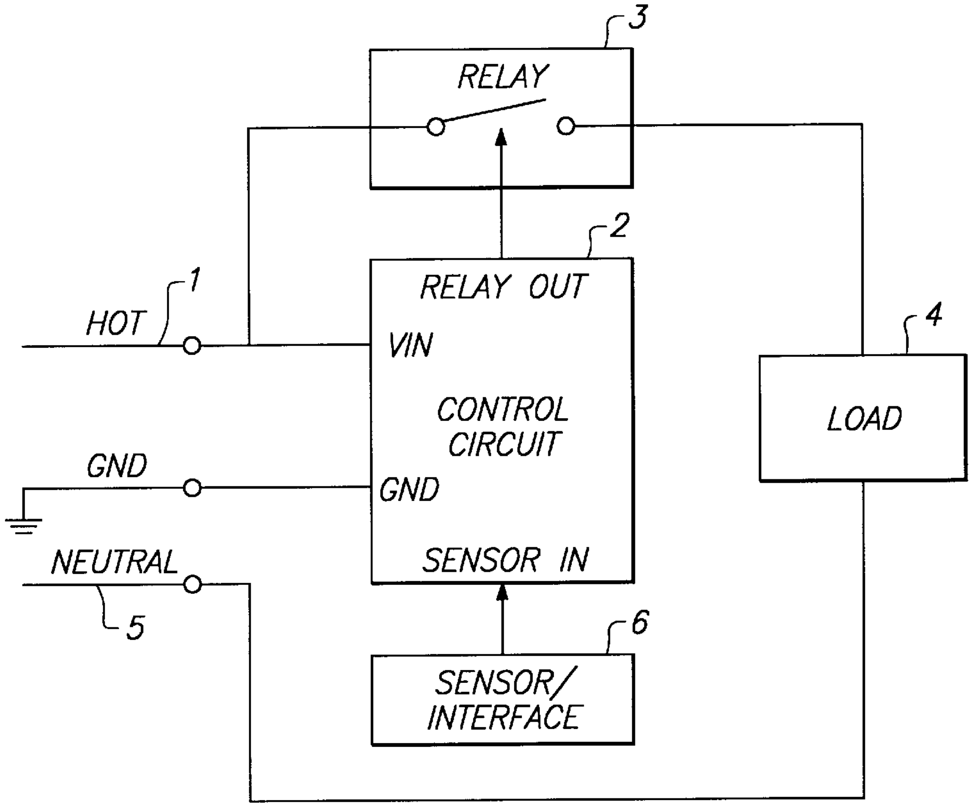
FIG. 1 illustrates a simplified block diagram of the present invention.

FIG. 1 illustrates a simplified block diagram of the present invention where a hot leg 1 of a utility power supply is coupled to an VIN terminal of a control circuit 2. A ground terminal of the control circuit 2 is coupled to ground. The hot leg 1 of the utility power supply is also coupled to a first pole of a relay 3. A second pole of the relay 3 is coupled to a first terminal of a load 4. A neutral leg 5 of a utility power supply is coupled to a second terminal of the load 4. A sensor 6 is coupled to an input of the control circuit 2. An output terminal of the control circuit 2 is coupled to a control terminal of the relay 3.

Referring to FIG. 1, the sensor 6 detects the presence of a person or persons in the vicinity of the sensor 6. When the sensor 6 detects that a person or persons is in its vicinity, the sensor 6 indicates this condition to the controller circuit 2. If the load 4 is powered off, the control circuit 2 monitors the line voltage on the hot leg 1 and activates the relay 3 to power on the load 4 when the line voltage on the hot leg 1 crosses the zero axis. Because there is a delay time between when the relay contacts are initiated to close and when the contacts actually close, the control circuit 2 initiates the relay contacts to close slightly before the line voltage actually reaches zero. Synchronizing the closing of relay contacts to when the voltage on the hot leg 1 is near zero minimizes the amount of current in-rush to through the relay contacts to the load 4, minimizing arcing and damage to the relay that can occur due to a large current in-rush. After the contacts have fully closed, the current through the relay contacts increases gradually as the voltage level on the hot leg 1 rises above or falls below zero.

Similarly, when the load 4 is powered on and the sensor 6 detects no persons in its vicinity for a predetermined period of time, the control circuit 2 activates the relay 3 to power down the load 4 when the voltage waveform on the hot leg 1 crosses the zero axis. Again, because there is a delay time between when the relay contacts are initiated to open and when they actually open, the control circuit 2 initiates the relay contacts to open slightly before the line voltage actually reaches zero. Synchronizing the opening of the relay contacts to when the voltage on the hot leg 1 is near zero minimizes the amount of kick-back power dissipated in the relay upon opening the relay contacts, minimizing arcing and any damage that can occur due to a high kick-back power.

Figure 2:
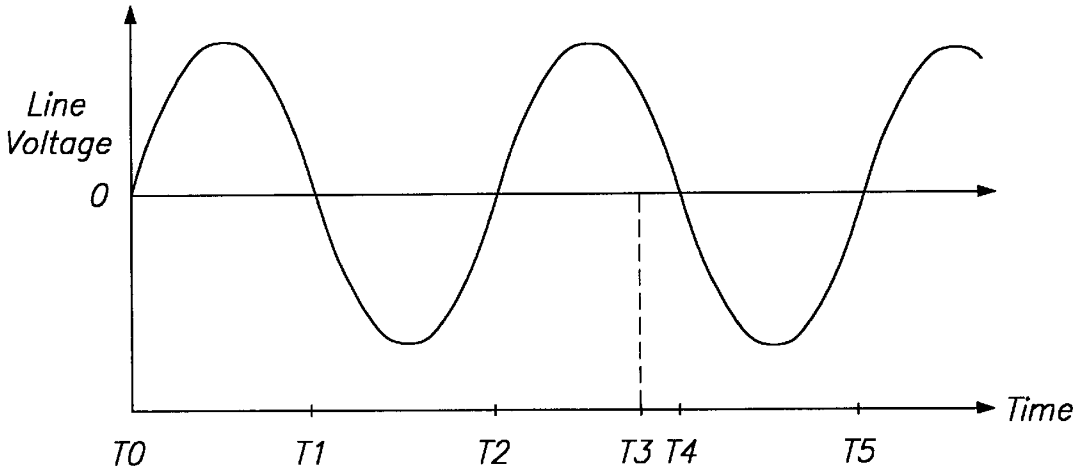
FIG. 2 illustrates a voltage waveform for the line voltage on the hot leg of the utility supply.

FIG. 2 illustrates a voltage waveform for the line voltage on the hot leg 1 of the utility supply. The line voltage crosses the zero axis at times T0, T1, T2, T4 and T5. If, during the period between T0 and T1, the control circuit 2 determines that the load 4 is to be powered on from a powered off condition, the control circuit 2 then measures a time period between successive zero crossings, such as a time period between T1 and T2, for predicting the occurrence of a subsequent zero crossing.

There is an inherent time delay $\Delta T$ between the time the control circuit 2 (FIG. 1) generates a control signal causing the relay 3 to close and the time when the relay contacts actually close. This time delay $\Delta T$ can be measured and is typically characterized by the manufacturer of relay switches. The time delay $\Delta T$ is shown as a portion of time on a line voltage graph represented in FIG. 2 by the time period between T3 and T4. Accordingly, to synchronize the closing of the relay contacts with a next zero crossing of the line voltage waveform, the control circuit 2 initiates a closing of the relay contacts at a time $\Delta T$ before the next zero crossing. When the contacts actually close, the line voltage waveform has reached the next zero crossing at a time T4. After the relay contacts close, the magnitude of the current through the relay contacts gradually increases as the line voltage falls below zero. It will be apparent that the relay contacts can be made to close at any zero crossing, such as at the time T2 or T5.

Similarly, there is a measurable inherent time delay $\Delta T'$ between when the control circuit 2 initiates the relay contacts to open from a closed condition, and when the relay contacts actually open. This time delay $\Delta T'$ for opening the relay contacts is not necessarily the same as the time delay for closing the relay contacts. Therefore, when the relay contacts are to be opened from a closed position, the control circuit 2 initiates an opening of the relay contacts before a zero crossing is predicted to occur an amount of time equal to the time delay for opening the relay contacts. It will be apparent that the relay contacts can also be made to close at any zero crossing of the line voltage.

Figure 3:
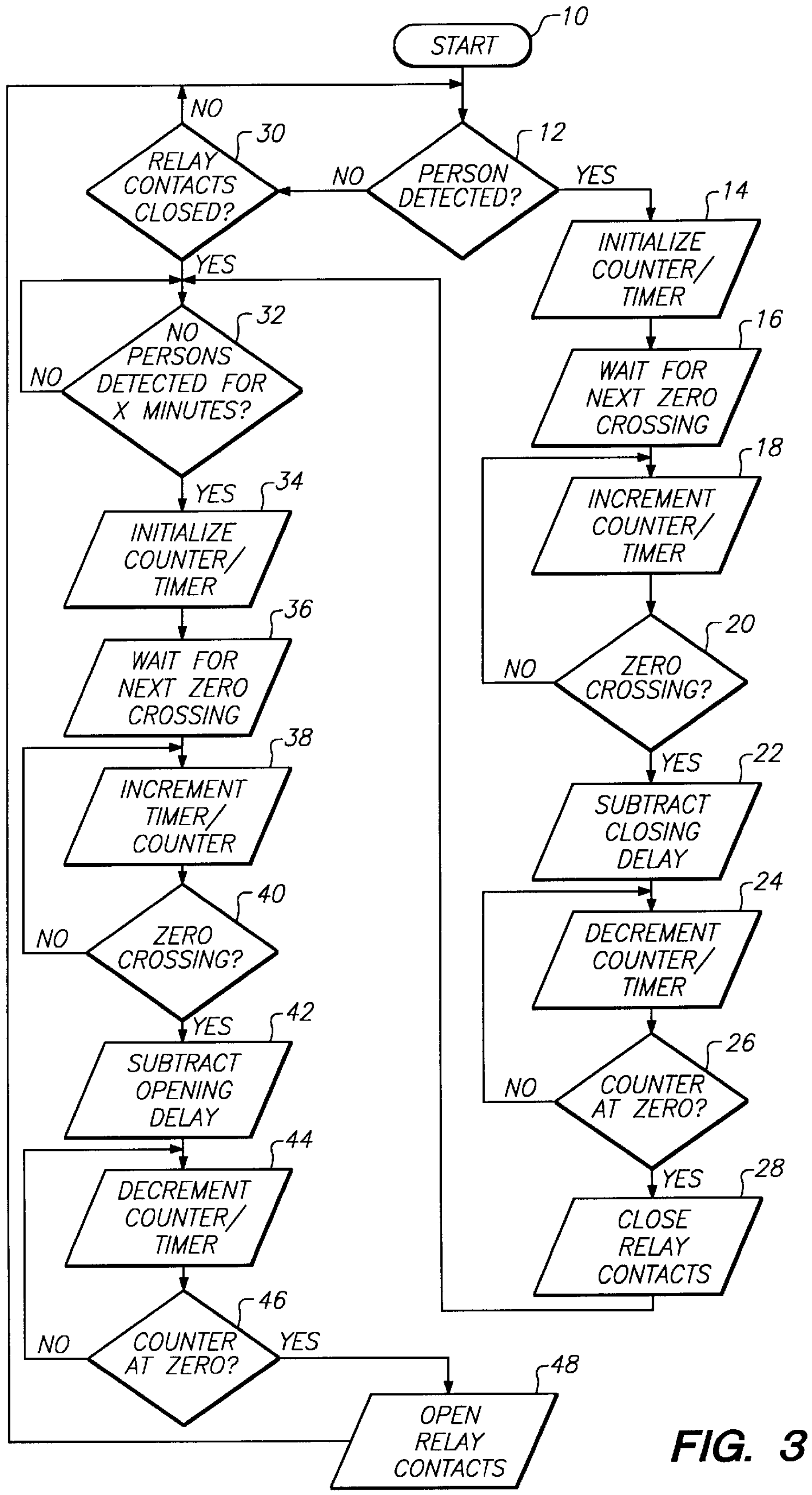
FIG. 3 illustrates a flow chart for operation of the circuit illustrated in FIG. 1.

FIG. 3 illustrates a flow chart for operation of the circuit illustrated in FIG. 1. Referal to both FIGS. 1 and 3 is necessary to fully understand the flow chart. From a starting block 10, program flow moves to a decision block 12. In the decision block 12, based upon an indication from the sensor 6, the control circuit 2 determines whether a person is detected in the vicinity of the sensor 6. If a person is detected, program flow moves to block 14, where a counter/timer is initialized to a predetermined value, such as zero. The counter/timer is preferably a register of a digital processor that is incremented for each pulse of a clock signal having a regular period, but can be a conventional integrated circuit counter. Once the counter/timer is initialized, program flow moves to block 16 where the control circuit 2 waits for a next zero crossing of the line voltage waveform on the hot leg 1. After this zero crossing is detected, program flow moves to block 18 where the timer/counter is incremented once. Then, program flow moves to decision block 20 where the control circuit 2 determines whether a next zero crossing has occurred. If not, the counter/timer is incremented once for each clock pulse until a zero crossing is detected.

Once a zero crossing is detected in decision block 20, program flow moves to decision block 22 where a previously measured and stored amount of time delay for closing the relay contacts, represented by a number of pulses of the clock signal, is subtracted from the number of times the counter/timer was incremented in decision block 20. Then, program flow moves to block 24 where the counter/timer is decremented once for each clock pulse until the counter/timer has counted down to the predetermined initialization value. Once the counter/timer has counted down to this value, as determined in decision block 26, program flow moves to block 28 where the control circuit 2 activates the relay 3 to close. Because the time delay for closing the relay contacts was subtracted from the time between pervious zero crossings, the contacts of the relay actually close when the line voltage waveform on the hot leg 1 reaches a zero crossing. After the control signal is applied to the relay to initiate the operation of closing the contacts in block 28, program flow moves to block 32 and begins a sequence for opening the relay contacts after waiting a predetermined period of time that no persons are detected by the sensor 6.

Referring to decision block 12, if the sensor 6 does not detect a person within its vicinity, program flow moves to decision block 30 where the control circuit 2 determines whether the relay contacts are closed. If the relay contacts are not closed, program flow returns to decision block 12 and the relay contacts remain open until a person is detected by the sensor 6.

If, in decision block 30, the control circuit 2 determines that the relay contacts are closed or if the relay contacts are closed in block 28, program flow moves to decision block 32 where the control circuit 2 determines if no persons are detected by the sensor 6 for a wait period. The wait period is the predetermined period of time that the load 4 is desired to be powered on after no persons are detected by the sensor 6 and can be any amount of time, but is preferably selectable to be between 30 seconds and 30 minutes. Therefore, if a person leaves the vicinity of the sensor 6 for only a short period of time, the load 4 will not be powered off unnecessarily, or if the sensor 6 momentarily does not detect a person in its vicinity, although a person is in the vicinity (e.g. an ambient noise sensor does not detect a person who is momentarily being very quiet), the load 4 will not be erroneously powered off. If a person is detected within the wait period, the wait period is restarted.

After the sensor 6 does not detect a person in its vicinity for the predetermined amount of time, program flow moves to block 34 where the timer counter is initialized to zero. Then, program flow moves to block 36 where the control circuit 2 waits for a zero crossing of the line voltage waveform on the hot leg 1. Once the zero crossing is detected, program flow moves to block 38 where the timer/counter is incremented and then moves to block 40 where the control circuit 2 determines whether a next zero crossing has occurred. The timer/counter is incremented once for each pulse of the clock signal until the next zero crossing is detected.

Once the next zero crossing is detected in decision block 40, program flow moves to decision block 42 where a previously measured and stored amount of time delay for opening the relay contacts represented by a number of pulses of the clock signal is subtracted from the number of time the counter/timer was incremented in decision block 38. Then, program flow moves to block 44 where the counter/timer is decremented once for each clock pulse until the counter/timer has counted down to zero. Once the counter/timer has counted down to zero, as determined in block 46, program flow moves to block 48 where the control circuit 2 activates the relay to close. Because the time delay for opening the contacts was subtracted from the time between pervious zero crossings, the contacts of the relay actually open when the line voltage waveform on the hot leg 1 reaches zero. After the relay contacts are initiated to open, in block 48, program flow returns to decision block 12.

When the load 4 is powered on, the current through the load 4 is ideally in phase with the line voltage waveform at the hot leg 1. Therefore, when the relay contacts transition from a closed condition to an open condition, there is zero voltage at the hot leg 1 and zero current flowing through the contacts. Fortunately, electronic ballasts utilized in fluorescent lighting systems that are characterized by high in-rush currents and high kick-back power tend to have resistive impedances such that the current through the load 4 is close in phase with the line voltage waveform. Other loads, however, may be characterized by a load impedance that has a reactive component such that the current through the load 4 is out of phase with the line voltage. To minimize the kick-back power when switching such reactive loads, the adjustment made to the value stored in the counter/timer in block 42 can be altered such that the relay contacts open slightly before, or slightly after, the zero crossing. There is no need to make such an adjustment when closing the relay contacts, however, because before closing the relay contacts, the load current is initially zero.

Figures 4, 4A:
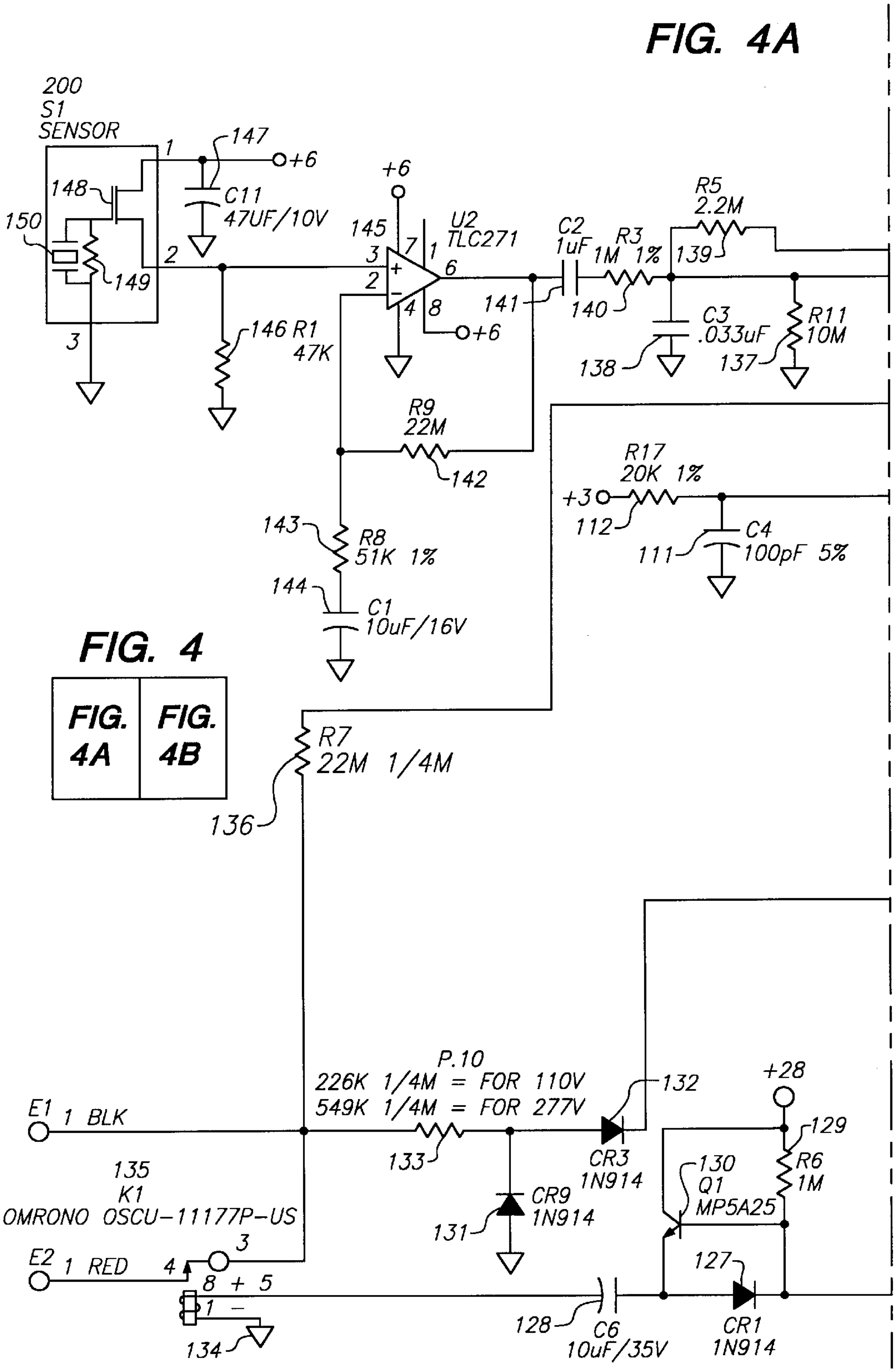
FIG. 4 illustrates a detailed schematic diagram of the present invention.
Figure 4B:
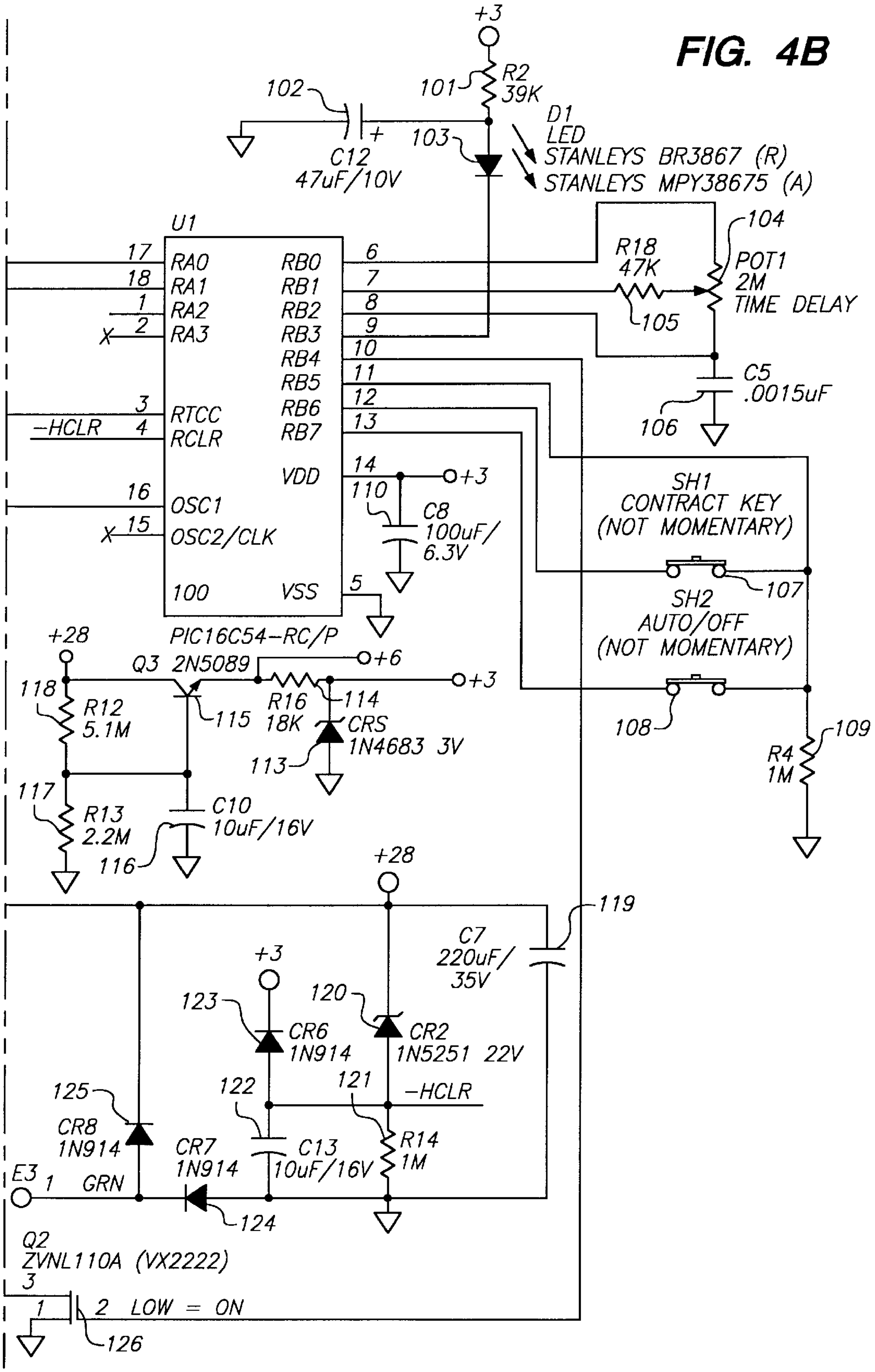

FIG. 4 illustrates a detailed schematic diagram of the present invention. A circuit resembling the circuit illustrated in FIG. 4 is available under model number IWS-ZP-277V from Unesco Services, Inc., located at 1350 South Loop Road, Suite 104, in Alameda, Calif. A sensor 200 has three terminals and includes a field effect transistor 148, a resistor 149 and a frequency generating oscillator 150. The sensor 200 is an infrared sensor. It will be understood, however, that the sensor 200 could be an ambient noise sensor, a motion sensor, a daylight sensor, a manually operated switch, an electronic timer, or the like. A drain of the transistor 148 is coupled to a first terminal of the sensor and the source of the transistor 148 is coupled to a second terminal of the sensor 200. A gate of the transistor 148 is coupled to a first terminal of the resistor 149 and to a first terminal of the frequency generating oscillator 150. A second terminal of the resistor 149 and a second terminal of the frequency generating oscillator 150 are coupled to a third terminal of the sensor 200.

The first terminal of the sensor 200 is coupled to a first terminal of a capacitor 147 (47 uF) and to a voltage supply of 6 volts. A second terminal of the capacitor is coupled to the ground node. The third terminal of the sensor 200 is coupled to a ground node. The second terminal of the sensor 200 is coupled to a first terminal of a resistor 146 (47 Kohms) and to a non-inverting input of an amplifier 145 (TLC271). A second terminal of the resistor 146 is coupled to the ground node. An inverting input of the amplifier is coupled to a first terminal of a resistor 142 (22 Megohms) and to a first terminal of a resistor 143 (51 Kohms). A second terminal of the resistor 143 is coupled to a first terminal of a capacitor 144 (10 uF). A second terminal of the capacitor 144 is coupled to the ground node.

A second terminal of the resistor 142 is coupled to an output of the amplifier 145 and to a first terminal of a capacitor 141 (1 uF). A second terminal of the capacitor 141 is coupled to a first terminal of a resistor 140 (1 Megohm). A second terminal of the resistor 140 is coupled to a first terminal of a resistor 139 (2.2 Megohms), to a first terminal of a capacitor 138 (0.033 uF), to a first terminal of a resistor 137 (10 Megohms) and to an RA1 input to a controller 100. A second terminal of the capacitor 138 and a second terminal of the resistor 137 are coupled to the ground node. A second terminal of the resistor 139 is coupled to an RA0 input of the controller 100.

A level of a signal generated by the sensor 200 is in the order of millivolts, while the amplifier 145 increases the level to be in the order of hundreds of millivolts. The RA1 input of the controller 100 has an input threshold for a transition of a logical low voltage to a logical high voltage of about one volt. To receive an indication from the sensor 200 as to whether a person is detected in its vicinity, the RA0 pin of the controller is set to a logical low voltage to discharge the capacitor 138 and, then, the RA0 pin is set to float. Next, an output signal from the amplifier 145 is allowed to charge the capacitor 138 for a period of approximately 16 milliseconds. At the end of the 16 millisecond period, the RA1 pin of the controller 100 is sensed to determine whether the voltage across the capacitor 138 has exceeded the one volt threshold.

If the voltage across the capacitor 138 has not exceeded the threshold, the RA0 pin is set to a logical high voltage and the time taken to charge the capacitor 138 to the threshold is measured in terms of processor clock cycles and stored. If, after the 16 millisecond period, the voltage across the capacitor 138 is above the threshold, the RA0 pin is set to a logical low voltage and the time for discharging the capacitor is measured in terms of clock cycles and stored. Therefore, a single value will be stored each time the controller 100 receives an indication from the sensor 200 as to whether a person is detected in its vicinity.

The controller 100 periodically and repeatedly receives an indication from the sensor 200 as to whether a person is detected in its vicinity. Therefore, a series of stored values are obtained. Preferably the controller 100 performs a digital filtering process on the series of values to remove any constant value (high-pass filtering) or any glitches (low-pass filtering). This prevents erroneous switching of the lighting or HVAC system caused by such occurrences. The filtering process is according to conventional methods of infinite impulse response digital filtering.

The controller 100 then compares the digitally filtered values to a reference value for determining whether a person or persons are in the vicinity of the sensor 200. The reference value is typically seven processor cycles, but could be more or less, depending upon the processor clock frequency and the desired sensitivity. If the stored value exceeds the reference value, then a detection event occurs (i.e. the presence of a person in the vicinity of the sensor 200 is indicated).

The controller 100 is preferably a PIC16C54-RC/P integrated circuit controller, but could be another controller circuit. A VSS pin of the controller 100 is coupled to ground. A VDD pin of the controller 100 is coupled to a 3 volt supply and to a first terminal of capacitor 110 (100 uF). A second terminal of the capacitor 110 is coupled to the ground node. A first terminal of a resistor 112 (20 Kohms) is coupled to the 3 volt supply. A second terminal of the resistor 112 is coupled to a first terminal of a capacitor 111 (100 pF) and to a OSC1 input of the controller 100. A second terminal of the capacitor 111 is coupled to the ground node. The resistor 112 and capacitor 111 set an internal clock frequency of the controller 100.

The 3 volt supply is coupled to a first terminal of a resistor 101 (39 Kohms). A second terminal of the resistor 101 is coupled to a first terminal of a capacitor 102 (47 uF). and to an anode of a light emitting diode 103. A cathode of the diode 103 is coupled to an RB3 pin of the controller 100. A second terminal of the capacitor 102 is coupled to the ground node. The diode 103 indicates that a person has been sensed in the vicinity of the sensor 200 by flashing. The resistor 101 and capacitor 102 provide for bright illumination of the diode 103 because the capacitor 102 is charged when the diode 103 is off and is discharged through the diode 103 upon its illumination.

An RB0 pin of the controller is coupled to a first terminal of an adjustable resistor 104 (2 Megohms). A second terminal of the adjustable resistor 104 is coupled to a first terminal of a capacitor 106 (0.0015 uF) and to an RB2 pin of the controller 100. A second terminal of the capacitor 106 is coupled to the ground node. A third, adjustable terminal of the adjustable resistor 104 is coupled to a first terminal of a resistor 105 (47 Kohms). A second terminal of the resistor 105 is coupled to an RB1 pin of the controller 100.

The adjustable resistor 104 controls the wait period between a time when the sensor 200 no longer detects a person in its vicinity and a time when the controller 100 determines that a powered on load is to be powered off. The controller 100 first discharges the capacitor 106 by bringing the RB2 pin to a logical low voltage. Then, the controller 100 charges the capacitor 106 from the RB0 pin through the entire resistance of the adjustable resistor 104 and the time to charge the capacitor to a threshold voltage of approximately one volt is measured and stored. Next, the capacitor 106 is discharged again. The capacitor 106 is then charged from pin RB1 through the resistor 105 and a portion of the resistance of the adjustable resistor 104. The time to charge the capacitor 106 to the threshold is measured and stored. Then, the stored times are compared such that the ratio of times determines the wait period. The wait period can preferably be adjusted to be from 30 seconds to 30 minutes by adjusting the adjustable resistor 104.

An RB6 pin of the controller 100 is coupled to a first terminal of a switch 107. An RB7 pin of the controller 100 is coupled to a first terminal of a switch 108. An RB5 pin of the controller is coupled to a second terminal of the switch 107, to a second terminal of the switch 108 and to a first terminal of a resistor 109 (1 Megohm). A second terminal of the resistor R4 is coupled to the ground node.

The switch 107 prevents the controller 100 from powering on a powered off load even if a person is detected in the vicinity of the sensor 200. The switch 107 prevents the load from powering on so long as the switch 107 is closed. Because this ability is not expected to be utilized often and to reduce cost, the switch 107 is preferably formed by providing contacts on a printed circuit board which are closed only when a conductor is placed across the contacts, however, a mechanical switch assembly could be utilized, if desired. When closed, the switch 108 powers up a powered off load and prevents the controller 100 from powering off the load even if no persons are detected in the vicinity of the sensor 200 for more than the wait period. Therefore, the switch 108 can be utilized to manually power on the load. Preferably, the switch 108 can be set to remain closed and is therefore, preferably not a momentary-on switch. The condition of the switches 107 and 108 are preferably sampled by the controller 100 every 16 milliseconds.

An RB 4 pin of the controller 100 is coupled to a gate of a field effect transistor 126 (ZVNL110A). A source of the transistor 126 is coupled to the ground node. A drain of the transistor 126 is coupled to a first terminal of a resistor 129 (1 Megohm), to a base of a bipolar transistor 130 (MPSA25) and to a cathode of a diode 127 (1N914). A second terminal of the resistor 129 is coupled to a 28 volt supply and to a collector of the transistor 130. An emitter of the transistor 130 is coupled to an anode of the diode 127 and to a first terminal of a capacitor 128 (10 uF). A second terminal of the capacitor 127 is coupled to a first terminal of a coil of a relay 135 (OMRON C6CU-1117P-US). A second terminal of the coil of the relay 135 is coupled to the ground node.

When the controller 100 determines that the load is to be powered on or powered off upon a zero crossing of the line voltage as described herein, the state of the contacts of the relay 135 are controlled from the RB4 pin of the controller 100 through the transistor 126 and the capacitor 128. The transistors 126 and 130, the resistor 129 and the diode 127 convert a 3 volt transition of the RB4 pin into a 26 volt transition on the capacitor 128. The relay 135 is preferably of the bi-stable latching type (i.e. its open or closed condition is maintained in the absence of current in the relay coil) and requires a low current in the coil of the relay to change the state of the relay contacts. Therefore, charging the capacitor 128 to 26 volts or discharging the capacitor 128 from 26 volts provides sufficient current for changing the condition of the relay contacts. The voltage applied to the coil of the relay 135 is preferably beyond the rated capacity of the coil of the relay 135. The voltage is applied for a limited duration, however, so as to prevent damage to the relay 135. By driving the coil of the relay 135 at this over-voltage, the condition of the contacts are assured to change rapidly resulting in a minimum of contact bounce.

A hot leg from a utility supply is coupled to a first terminal of a resistor 133 (226 Kohms for 110 VAC supply or 549 Kohms for 277 VAC supply), to a first contact of the relay and to a first terminal of a resistor 136 (22 Megohms). A second contact of the relay 135 is to be coupled to the load (not shown). A second terminal of the resistor 136 is coupled to a RICC input of the controller 100. A second terminal of the resistor 133 is coupled to a cathode of a diode 131 (1N914) and to an anode of a diode 132 (1N914). An anode of the diode 131 is coupled to the ground node. A cathode of the diode 132 is coupled to a cathode of a diode 125 (1N914), to a cathode of a Zener diode 120 (1N5251) and to a first terminal of a capacitor 119 (220 uF), forming a 28 volt supply node.

An anode of the diode 125 and a cathode of a diode 124 (1N914) are coupled to earth ground. An anode of the diode 120 is coupled to a –MCLR input of the controller 100, to a first terminal of a resistor 121 (1 Megohms), to a first terminal of a capacitor 122 (10 uF) and to a anode of a diode 123 (1N914). A cathode of the diode 123 is coupled to the 3 volt supply. An anode of the diode 124, a second terminal of the capacitor 122, a second terminal of the resistor 121 and a second terminal of the capacitor 119 are coupled to the ground node.

The 28 volt supply node is coupled to a first terminal of a resistor 118 (5.1 Megohms) and to a collector of a bipolar transistor 115 (2N5089). A Second terminal of the resistor 118 is coupled to a first terminal of a resistor 117 (2.2 Megohms), to a base of the transistor 115 and to a first terminal of a capacitor 116 (10 uF). A second terminal of the resistor 117 and a second terminal of the capacitor 116 are coupled to the ground node. An emitter of the transistor 115 is coupled to a first terminal of a resistor 114 (18 Kohms) forming a 6 volt supply node for providing power to the amplifier 145. A second terminal of the resistor 114 is coupled to a cathode of a Zener diode 113 (1N4683), forming the 3 volt supply node. A second terminal of the zener diode is coupled to the ground node.

Power for the circuit illustrated in FIG. 4 is derived from current through the resistor 133 due to ground leakage to earth ground. The diodes 124, 125, 132 and 133 rectify the supply voltage and the Zener diode 120 regulates the rectified voltage for generating the 28 volt supply. The voltage at 28 volt supply node is the sum of the 3 volt supply, the voltage drop across the diode 123 and the voltage drop across the Zener diode 120. The capacitor 119 serves as a power supply bypass capacitor. The 6 volt supply is generated from the 28 volt supply by the resistors 117 and 188, the capacitor 116 and the transistor 115. The 3 volt supply is generated from the 6 volt supply by the resistor 114 and the Zener diode 113. The diode 124 provides a current path from the ground node of the circuit to earth ground.

The reset pin –MCLR of the controller remains at a logical low voltage until the voltage supplies are stable and sufficient current passes through the Zener diode 120 to raise the voltage level of the –MCLR pin sufficiently to enable the controller 100. The diode 123 prevents the voltage at the –MCLR pin from exceeding 3 volts by more than the voltage drop across the diode 123.

The controller 100 monitors the voltage at the RICC pin for sensing zero crossings of the line voltage waveform of the utility supply for ensuring that the opening or closing of the contacts of the relay 135 coincide with zero crossings of the line voltage waveform. The controller 100 initiates energizing the relay 134 an appropriate amount of time before a zero crossing such that actual contact closure or opening occurs at a zero crossing. Once the controller 100 has determined that the relay contacts are to be closed or opened condition, the controller 100 measures the period of the utility supply waveform through the RICC pin in terms of clock cycles of the controller 100. The controller 100 measures a time between zero crossings by counting a number of clock cycles between zero crossings. This time is approximately 8.33 milliseconds for a 60 Hz utility supply. Then, the controller 100 subtracts a delay time for closing or opening the relay contacts, as appropriate, from the time between zero crossings to determine an amount of time after a subsequent zero crossing to initiate closing or opening the relay contacts.

Relay closure times are estimated to be about 2.4 milliseconds and with variations between individual relays estimated to be less than 0.5 milliseconds. Relay opening times are estimated to be comparable. These times compare favorably with half-cycle times for the supply voltage waveform of 8.33 milliseconds. For example, if a relay is closed at 0.5 milliseconds before, or 0.5 milliseconds after, a zero crossing, the energy dissipated in the relay is expected to be less that approximately 0.5% of the energy dissipated had the relay contacts closed at a time of maximum line voltage. Accordingly, while it is anticipated that the relay contacts will open or close within a margin of error before or after the line voltage crosses the zero axis, this is not anticipated to significantly affect the performance of the device.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. For example, it will be apparent that one or more of the time periods or component values disclosed herein can be altered. Further, it would be apparent that other means for predicting future zero crossing could be utilized. For example, a time could be measured over any multiple of half-cycles of the utility supply waveform, (e.g. a full cycle), or a time could be calculated by averaging a number of elapsed times between zero crossings or multiples of zero crossings. Or, a capacitor can be charged at a constant rate during a period between zero crossings and discharged after a zero crossing at the same rate to predict a future zero crossing. Alternatively, a future zero crossing can be predicted by sensing the voltage level of the AC waveform, and when the voltage level reaches a predetermined level as it approaches zero volts, a precise time at which the zero crossing will occur can be anticipated based upon knowledge of the peak value and frequency of the AC waveform.

What is claimed is:

1. An apparatus for selectively providing power to a load, the apparatus comprising:

a. means for measuring an amount of time between a first zero crossing of an AC supply voltage and a second zero crossing of the AC supply voltage; and b. means for initiating a change in condition of a switching relay coupled to the means for measuring wherein, the means for initiating initiates a change in condition of the switching relay an amount of time after a third zero crossing wherein the amount of time after the third zero crossing is equal to the amount of time between the first zero crossing and the second zero crossing less a delay time for changing a condition of the switching relay.

2. The apparatus according to claim 1 wherein the switching relay is a bi-stable switching relay having a coil wherein the means for initiating a change in condition of the switching relay appropriately charges or discharges a capacitor through the coil wherein a voltage beyond a voltage that the coil can withstand for an extended duration is maintained for a short duration.

3. The apparatus according to claim 1 wherein the means for measuring counts a first number of clock pulses which occur after the first zero crossing of the AC supply voltage and before the second zero crossing of the AC supply voltage.

4. The apparatus according to claim 3 wherein the delay time is represented by a second number of clock pulses wherein the amount of time after the third zero crossing is determined by subtracting the second number of clock pulses from the first number of clock pulses.

5. The apparatus according to claim 4 further comprising a sensor for determining whether an area is occupied wherein the means for initiating initiates the switching relay to change from an open condition to a closed condition after determining that the area is occupied.

6. The apparatus according to claim 4 further comprising a sensor for determining whether an area is occupied wherein the means for initiating initiates the switching relay to change from a closed condition to an open condition after determining that the area has not been occupied for a predetermined amount of time.

7. An apparatus for selectively providing power to a load the apparatus comprising:

a. means for measuring an amount of time between a measurement initiating zero crossing of an AC supply voltage and a measurement terminating zero crossing of the AC supply voltage wherein one or more additional zero crossings occur between the measurement initiating zero crossing and the measurement terminating zero crossing; and b. means for initiating a change in condition of a switching relay coupled to the means for measuring wherein the means for initiating initiates a change in condition of the switching relay an amount of time after a change in condition initiating zero crossing wherein the change in condition initiating zero crossing occurs after the measurement terminating zero crossing and wherein the amount of time after the change in condition initiating zero crossing is equal to the amount of time between the measurement initiating zero crossing and the measurement terminating zero crossing less a delay time for changing a condition of the switching relay.

8. A method of selectively providing power to a load wherein the method comprises steps of:

a. determining that a powered off load is to be powered on;

b. sensing an occurrence of a first zero crossing of an AC supply voltage;

c. measuring an elapsed time between the first zero crossing and a second zero crossing of the AC supply voltage;

d. sensing a third zero crossing of the AC supply voltage; and e. initiating a closure of a switching relay an amount of time after the third zero crossing wherein the amount of time after the third zero crossing is equal to the elapsed time less a delay time for closing the switching relay.

9. The method according to claim 8 wherein the step of measuring includes steps of:

a. initializing a count to a starting number; and b. incrementing the count for each pulse of a clock signal that occurs between the first zero crossing and the second zero crossing.

10. The method according to claim 9 wherein the step of initiating comprises steps of:

a. subtracting a number from the count wherein the number is representative of the delay time for closing the switching relay;

b. decrementing the counter for each pulse of the clock signal that occurs after the third zero crossing; and c. initiating a closure of the switching relay when the starting number is reached.

11. The method according to claim 10 wherein the step of initiating a closure of the switching relay includes a step of applying a voltage across a coil of the switching relay wherein the coil is rated to withstand a continuously applied voltage and wherein the voltage applied across the coil is higher than the continuously applied voltage and is for a limited duration.

12. A method of selectively providing power to a load wherein the method comprises steps of:

a. determining that a powered off load is to be powered on;

b. sensing an occurrence of a measurement initiating zero crossing of an AC supply voltage;

c. measuring an elapsed time between the measurement initiating zero crossing and a measurement terminating zero crossing of the AC supply voltage wherein one or more additional zero crossings occur between the measurement initiating zero crossing and the measurement terminating zero crossing and wherein the step of measuring includes steps of:

i. initializing a count to a starting number; and ii. incrementing the count for each pulse of a clock signal that occurs between the measurement initiating zero crossing and the measurement terminating zero crossing;

d. sensing a closure initiating zero crossing of the AC supply voltage wherein the closure initiating zero crossing occurs after the measurement terminating zero crossing; and e. initiating a closure of a switching relay an amount of time after the closure initiating zero crossing wherein the amount of time after the closure initiating zero crossing is equal to the elapsed time less a delay time for closing the switching relay and wherein the step of initiating comprises steps of:

i. subtracting a number from the count wherein the number is representative of the delay time for closing the switching relay;

ii. decrementing the counter for each pulse of the clock signal that occurs after the closure initiating zero crossing; and iii. initiating a closure of the switching relay when the starting number is reached.

13. A method of selectively providing power to a load wherein the method comprises steps of:

a. determining that a powered on load is to be powered off;

b. sensing an occurrence of a first zero crossing of an AC supply voltage;

c. measuring an elapsed time between the first zero crossing and a second zero crossing of the AC supply voltage;

d. sensing a third zero crossing of the AC supply voltage; and e. initiating an opening of a switching relay an amount of time after the third zero crossing wherein the amount of time after the third zero crossing is equal to the elapsed time less a delay time for opening the switching relay.

14. The method according to claim 13 wherein the step of measuring includes steps of:

a. initializing a count to a starting number; and b. incrementing the count for each pulse of a clock signal that occurs between the first zero crossing and the second zero crossing.

15. The method according to claim 14 wherein the step of initiating comprises steps of:

a. subtracting a number from the count wherein the number is representative of the delay time for opening the switching relay;

b. decrementing the counter for each pulse of the clock signal that occurs after the third zero crossing; and c. initiating an opening of the switching relay when the starting number is reached.

16. The method according to claim 15 wherein the step of initiating an opening of the switching relay includes a step of applying a voltage across a coil of the switching relay wherein the coil is rated to withstand a continuously applied voltage and wherein the voltage applied across the coil is higher than the continuously applied voltage and is for a limited duration.

17. A method of selectively providing power to a load wherein the method comprises steps of:

a. determining that a powered on load is to be powered off;

b. sensing an occurrence of a measurement initiating zero crossing of an AC supply voltage;

c. measuring an elapsed time between the measurement initiating zero crossing and a measurement terminating zero crossing of the AC supply voltage wherein one or more additional zero crossings occur between the measurement initiating zero crossing and the measurement terminating zero crossing and wherein the step of measuring includes steps of:

i. initializing a count to a starting number; and ii. incrementing the count for each pulse of a clock signal that occurs between the measurement initiating zero crossing and the measurement terminating zero crossing;

d. sensing a opening initiating zero crossing of the AC supply voltage wherein the opening initiating zero crossing occurs after the measurement terminating zero crossing; and e. initiating an opening of a switching relay an amount of time after the opening initiating zero crossing wherein the amount of time after the opening initiating zero crossing is equal to the elapsed time less a delay time for opening the switching relay and wherein the step of initiating comprises steps of:

i. subtracting a number from the count wherein the number is representative of the delay time for opening the switching relay;

ii. decrementing the counter for each pulse of the clock signal that occurs after the opening initiating zero crossing; and iii. initiating an opening of the switching relay when the starting number is reached.

18. An apparatus for selectively providing power to a load, the apparatus comprising:

a. a switching relay for selectively providing power to the load from an AC supply wherein the switching relay has a closed condition and a open condition;

b. a sensor for sensing whether an area is occupied; and c. a controller circuit coupled to the switching relay and to the sensor wherein the controller circuit comprises:

(1) means for detecting zero crossings of the AC line voltage;

(2) means for measuring an amount of time between two zero crossings of the AC line voltage;

(3) first means for initiating the switching relay change from the open condition to the closed condition coupled to the switching relay wherein a closing delay time is an amount of time for the relay to change from the open condition to the closed condition wherein when the switching relay is the open condition and the sensor senses that the area is occupied, the first means for initiating waits the amount of time between two zero crossings less the closing delay time after a zero crossing is detected before initiating the switching relay to change from the open condition to the closed condition; and (4) second means for initiating the switching relay to change from the closed condition to the open condition coupled to the switching relay wherein an opening delay time is an amount of time for the relay to change from the open condition to the closed condition wherein when the switching relay is in the closed condition and the sensor has sensed that the area has not been occupied for a predetermined amount of time, the second means for initiating waits the amount of time between two zero crossings less the opening delay time after a zero crossing is detected before initiating the switching relay to change from the closed condition to the open condition.

19. An apparatus for selectively providing power to a load, the apparatus comprising:

a. means for measuring an amount of time between a first zero crossing of an AC supply voltage and a second zero crossing of the AC supply voltage; and b. means for initiating a change in condition of a switching relay coupled to the means for measuring wherein, the means for initiating initiates a change in condition of the switching relay an amount of time after the second zero crossing wherein the amount of time after the second zero crossing is equal to the amount of time between the first zero crossing and the second zero crossing less a delay time for changing a condition of the switching relay.

20. The apparatus according to claim 19 wherein the switching relay is a bi-stable switching relay having a coil wherein the means for initiating a change in condition of the switching relay appropriately charges or discharges a capacitor through the coil wherein a voltage beyond a voltage that the coil can withstand for an extended duration is maintained for a short duration.

21. The apparatus according to claim 19 wherein the means for measuring counts a first number of clock pulses which occur after the first zero crossing of the AC supply voltage and before the second zero crossing of the AC supply voltage.

22. The apparatus according to claim 21 wherein the delay time is represented by a second number of clock pulses wherein the amount of time after the second zero crossing is determined by subtracting the second number of clock pulses from the first number of clock pulses.

23. The apparatus according to claim 22 further comprising a sensor for determining whether an area is occupied wherein the means for initiating initiates the switching relay to change from an open condition to a closed condition after determining that the area is occupied.

24. The apparatus according to claim 22 further comprising a sensor for determining whether an area is occupied wherein the means for initiating initiates the switching relay to change from a closed condition to an open condition after determining that the area has not been occupied for a predetermined amount of time.

25. An apparatus for selectively providing power to a load, the apparatus comprising:

a. means for measuring an amount of time between a zero crossing of an AC supply voltage and a subsequent zero crossing of the AC supply voltage wherein one or more additional zero crossings occur between the zero crossing and the subsequent zero crossing; and b. means for initiating a change in condition of a switching relay coupled to the means for measuring wherein, the means for initiating initiates a change in condition of the switching relay an amount of time after the subsequent zero crossing wherein the amount of time after the subsequent zero crossing is equal to the amount of time between the zero crossing and the subsequent zero crossing less a delay time for changing a condition of the switching relay.

26. A method of selectively providing power to a load wherein the method comprises steps of:

a. determining that a powered off load is to be powered on;

b. sensing an occurrence of a first zero crossing of an AC supply voltage;

c. measuring an elapsed time between the first zero crossing and a second zero crossing of the AC supply voltage; and e. initiating a closure of a switching relay an amount of time after the second zero crossing wherein the amount of time after the second zero crossing is equal to the elapsed time less a delay time for closing the switching relay.

27. The method according to claim 26 wherein the step of measuring includes steps of:

a. initializing a count to a starting number; and b. incrementing the count for each pulse of a clock signal that occurs between the first zero crossing and the second zero crossing.

28. The method according to claim 27 wherein the step of initiating comprises steps of:

a. subtracting a number from the count wherein the number is representative of the delay time for closing the switching relay;

b. decrementing the counter for each pulse of the clock signal that occurs after the second zero crossing; and c. initiating a closure of the switching relay when the starting number is reached.

29. The method according to claim 28 wherein the step of initiating a closure of the switching relay includes a step of applying a voltage across a coil of the switching relay wherein the coil is rated to withstand a continuously applied voltage and wherein the voltage applied across the coil is higher than the continuously applied voltage and is for a limited duration.

30. A method of selectively providing power to a load wherein the method comprises steps of:

a. determining that a powered off load is to be powered on;

b. sensing an occurrence of a zero crossing of an AC supply voltage;

c. measuring an elapsed time between the zero crossing and a subsequent zero crossing of the AC supply voltage wherein one or more additional zero crossings occur between the zero crossing and the subsequent zero crossing and wherein the step of measuring comprises steps of:

i. initializing a count to a starting number; and ii. incrementing the count for each pulse of a clock signal that occurs between the zero crossing and the subsequent zero crossing; and d. initiating a closure of a switching relay an amount of time after the subsequent zero crossing wherein the amount of time after the subsequent zero crossing is equal to the elapsed time less a delay time for closing the switching relay wherein the step of initiating comprises steps of:

i. subtracting a number from the count wherein the number is representative of the delay time for closing the switching relay;

ii. decrementing the counter for each pulse of the clock signal that occurs after the subsequent zero crossing; and iii. initiating a closure of the switching relay when the starting number is reached.

31. A method of selectively providing power to a load wherein the method comprises steps of:

a. determining that a powered on load is to be powered off;

b. sensing an occurrence of a first zero crossing of an AC supply voltage;

c. measuring an elapsed time between the first zero crossing and a second zero crossing of the AC supply voltage; and e. initiating an opening of a switching relay an amount of time after the second zero crossing wherein the amount of time after the second zero crossing is equal to the elapsed time less a delay time for opening the switching relay.

32. The method according to claim 31 wherein the step of measuring includes steps of:

a. initializing a count to a starting number; and b. incrementing the count for each pulse of a clock signal that occurs between the first zero crossing and the second zero crossing.

33. The method according to claim 32 wherein the step of initiating comprises steps of:

a. subtracting a number from the count wherein the number is representative of the delay time for opening the switching relay;

b. decrementing the counter for each pulse of the clock signal that occurs after the second zero crossing; and c. initiating an opening of the switching relay when the starting number is reached.

34. The method according to claim 33 wherein the step of initiating an opening of the switching relay includes a step of applying a voltage across a coil of the switching relay wherein the coil is rated to withstand a continuously applied voltage and wherein the voltage applied across the coil is higher than the continuously applied voltage and is for a limited duration.

35. A method of selectively providing power to a load wherein the method comprises steps of:

a. determining that a powered on load is to be powered off;

b. sensing an occurrence of a zero crossing of an AC supply voltage;

c. measuring an elapsed time between the zero crossing and a subsequent zero crossing of the AC supply voltage, wherein one or more additional zero crossings occur between the zero crossing and the subsequent zero crossing; and d. initiating an opening of a switching relay an amount of time after the subsequent zero crossing wherein the amount of time after the subsequent zero crossing is equal to the elapsed time less a delay time for opening the switching relay wherein the step of initiating an opening of the switching relay includes a step of applying a voltage across a coil of the switching relay wherein the coil is rated to withstand a continuously applied voltage and wherein the voltage applied across the coil is higher than the continuously applied voltage and is for a limited duration.

* * * * *